Aug. 8, 1939. C. C. GLIDDEN 2,168,645
LINKAGE MECHANISM
Filed May 11, 1936 4 Sheets-Sheet 1

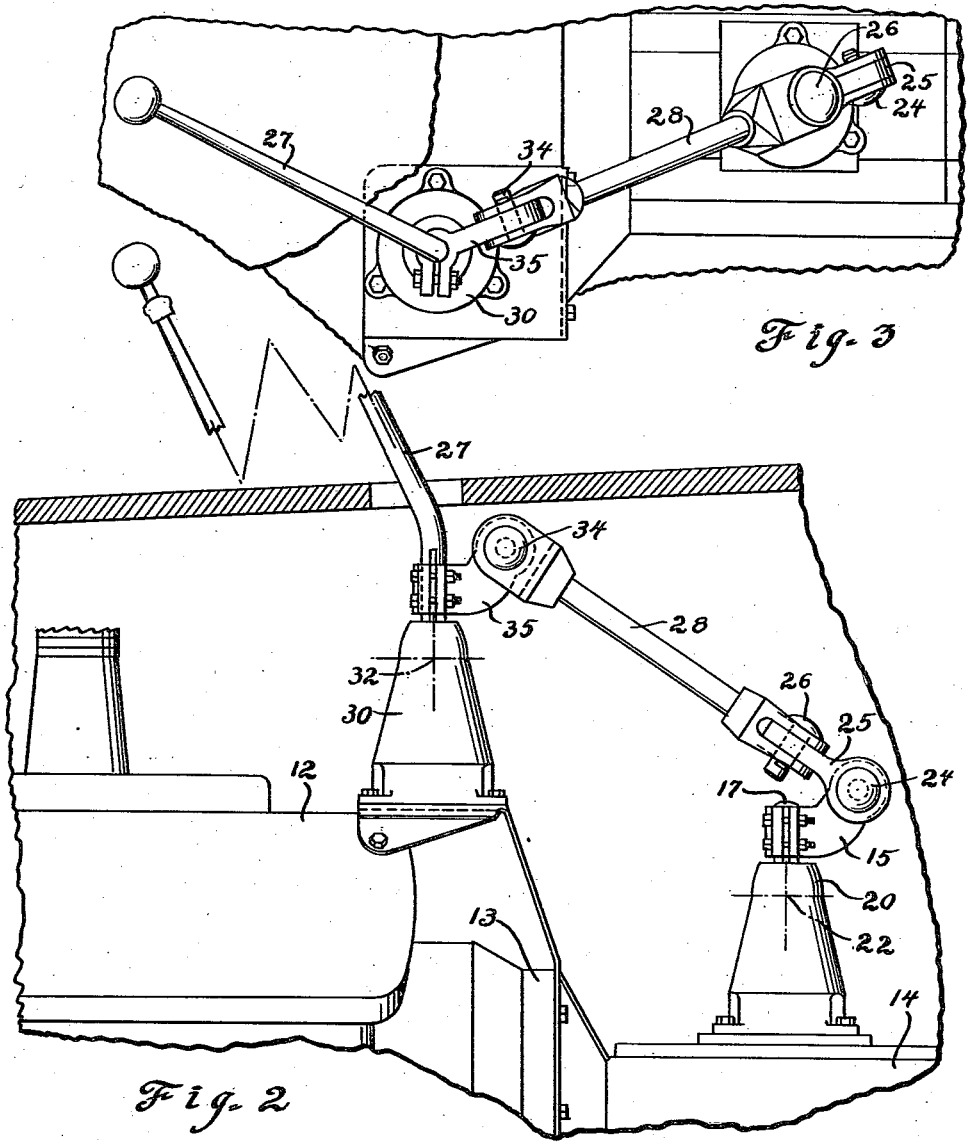

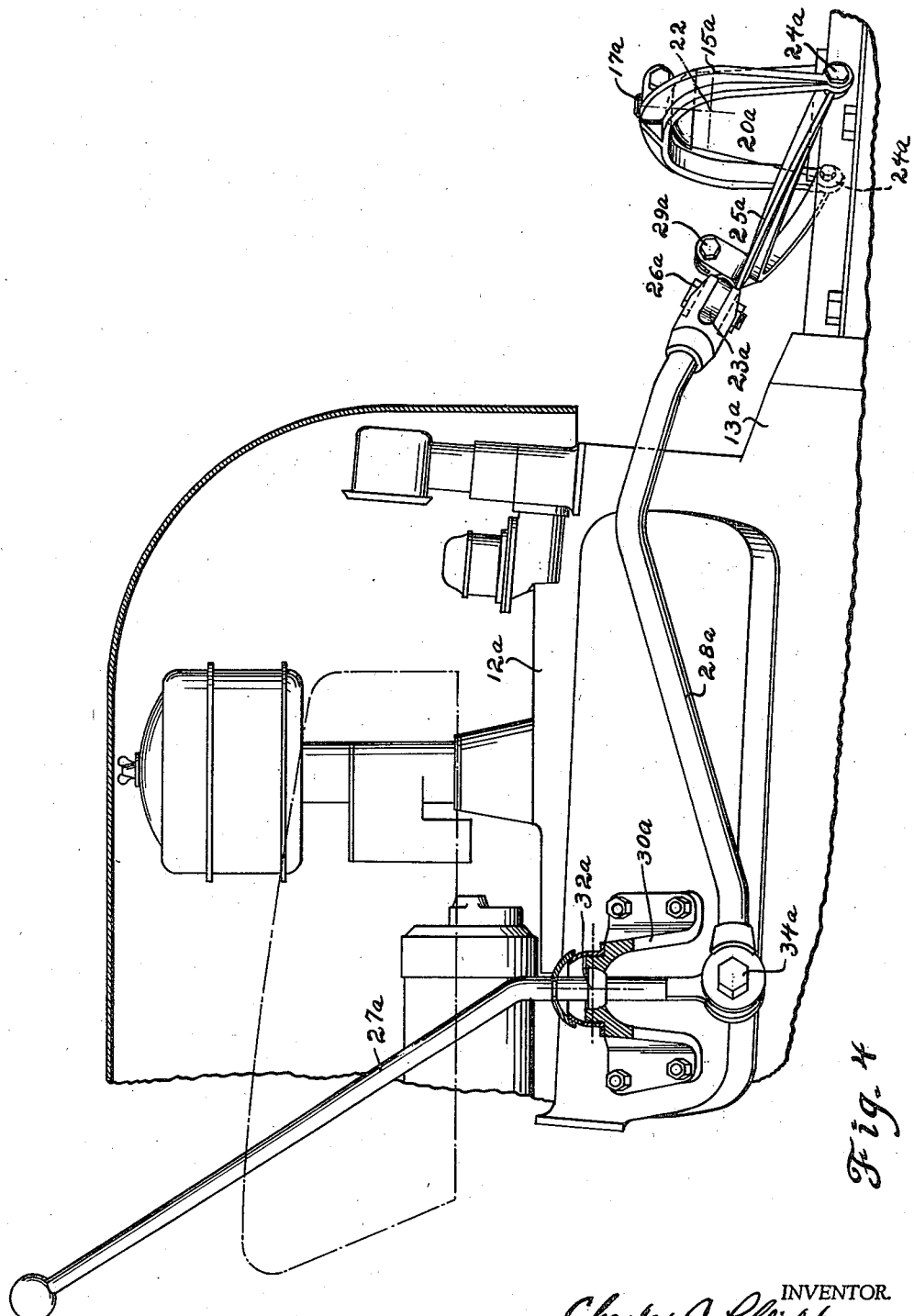

Aug. 8, 1939.   C. C. GLIDDEN   2,168,645
LINKAGE MECHANISM
Filed May 11, 1936   4 Sheets-Sheet 4

INVENTOR.
Charles C. Glidden
BY
ATTORNEYS.

Patented Aug. 8, 1939

2,168,645

UNITED STATES PATENT OFFICE 2,168,645

LINKAGE MECHANISM

Charles C. Glidden, Highland Park, Mich., assignor to Edward H. Perkins, Royal Oak, Mich., and Herbert R. D. Wilson, Baltimore, Md.

Application May 11, 1936, Serial No. 79,101

6 Claims. (Cl. 74—473)

This invention relates to linkage mechanisms for transmitting limited transverse and longitudinal movement, and is particularly directed to linkage especially adapted for remote control of hand-shifted change speed gear transmissions.

Modern trends in the design and construction of motor vehicles frequently make it desirable to locate the driver's compartment at a considerable distance from the engine and/or transmission, as when the engine is located at the rear of the vehicle, or under or behind the driver's seat, making control of gear shifting more difficult than when a simple lever may extend into the driver's compartment from a transmission conveniently located directly beneath the floor of such compartment. Various mechanical arrangements of cables, levers and sliding rods have been employed, as well as electrical magnetic, pneumatic, and vacuum operated shifting devices, all of which are relatively complicated and expensive, apt to get out of order, and, which is more important, do not give the driver the same sense of touch or "feel" for the gears as where direct mechanical actuation by means of a lever incorporating little or no lost motion is provided. The objects of my invention may be summarized as looking toward overcoming the mentioned difficulties while enabling control of the transmission from a remote point by means of simple and positive linkage conveying the motion through a single rigid shaft, with substantially no lost motion, giving the operator the same sensation in operation, and feeling for the gears, as is provided by a conventional shift lever, in which no parts are incorporated which are apt to fail or require servicing or attention.

Other objects and advantages will be apparent from the following description, wherein reference is made to the accompanying drawings illustrating preferred embodiments of my invention and wherein similar reference numerals designate similar parts throughout the several views.

In the drawings:

Figure 2 is an enlarged side elevational view of the operating mechanism.

Figure 3 is a plan view thereof.

Figure 4 is a side view similar to Figure 2 of a somewhat modified construction.

Figure 1:
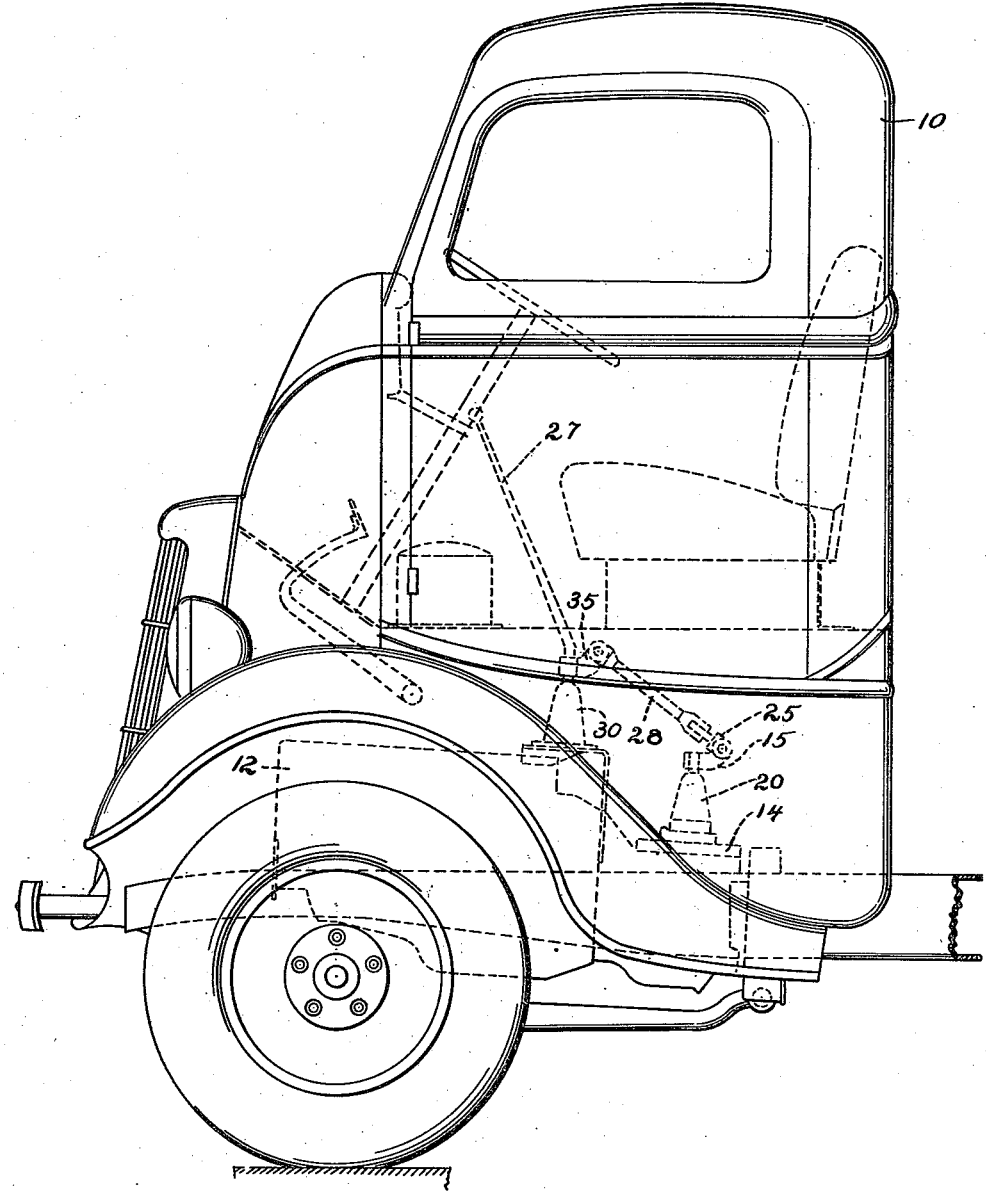
Figure 1 is a side elevational view of the front portion of a motor truck incorporating remote control gear shifting mechanism constructed in accordance with the present invention.

Referring now to the drawings, and particularly to Figure 1, in which is shown an illustrative truck construction incorporating a driver's cab 10 located in an elevated position above the engine 12 and somewhat forward of the transmission 14, it will be seen that convenient operation of the transmission when so located demands provision of some form of remote control mechanism. My preferred apparatus for this purpose is best shown in Figures 2 and 3, and includes an arm 15 rigidly fastened to the operating lever 17. Such lever, as shown, need only be of sufficient length to accommodate the arm 15, although otherwise similar to the conventional lever, which, when the engine and transmission assembly 12—14 are mounted suitably, extends into the driver's compartment for direct actuation by the operator. The lever 17 is connected to and arranged to operate the sliding gears or clutches, or other change speed mechanism, by means of any desired or convenient mechanism, which, inasmuch as it forms no part of my present invention, need not be described and is not shown.

The motion necessary to be imparted to the lever 17 in shifting is considered, as is usual, to comprise a pivotal movement, in planes perpendicular to each other, about the centre designated 22.

The arm 15 extends upwardly and may be somewhat offset from the axis of the shifting lever, although offsetting is not essential, and carries a horizontal pivot pin 24 to which is connected a clevis 25, and carrying a second pivot pin 26 perpendicular to pin 24 and to the axis of the clevis 25, and a link 28 is connected to the clevis by said last mentioned pin. The link 28 comprises a rigid shaft extending to a point adjacent the remote control shifting lever 27, which is mounted for movement similar to that of the lever 17, in a manner to project into the driver's compartment in the usual or any desired position. In the shown construction the remote control lever is carried in a support 30 bolted to the motor 12 and clutch housing 13, although, as will be recognized, the manner and place of its mounting may be varied at will. In the illustrated construction the centre of movement 32 of lever 27 is offset both vertically and horizontally from the centre 22 of the main lever 17.

Link 28 is articulated to lever 27 for pivotal movement about a horizontal axis perpendicular to that of the link, the pivot pin 34 being carried in an arm 35 fastened to lever 27 similarly to the support of pin 24 in arm 15. In the shown construction the location of pivot pin 34 with respect to centre 32 is similar to the location of pivot pin 24 with respect to centre 22, although this is not essential, inasmuch as location of one nearer or farther from its centre will of course act merely to change the relative transmitted motion.

It will be seen that rocking movement of the hand lever 27 from side to side is transmitted in torsion through the link 28, and is not affected by the presence of the pivot pins, since all are perpendicular to the axis of the link, while movement of the hand lever forward and backward is transmitted through the link in tension and compression. This mechanism constitutes an approximate parallelogram, with corners articulated at centres 22 and 32 and at pins 24 and 34, which articulation is necessary, as in transmitting longitudinal motion the interior angles change, the location of the joint at centres 22 and 32 being fixed by the construction. This longitudinal motion would be transmitted by the link 28 in tension and compression and a pivot would not be required at pin 26 for this purpose. Rocking movement of the operating lever 27 from side to side is transmitted through link 28 in torsion, which is not affected by the presence of the pivot pins since all are perpendicular to the axis of the link. The transverse motion to be transmitted to lever 17 is fixed by the transmission and is determined by the fulcrum at centre 22 and the positions of the lower end of the lever 17. Without a pivot at pin 26 the link 28 would be essentially an upward extension of lever 17, with the result that motion of lever 17 would produce motion of pin 34 and arm 35 in an arc proportional to the distance from centre 22, and would not permit the use of centre 32 as a fulcrum for lever 27. The pivot pin 26 is therefore introduced to break the vertical continuity of the linkage and lever 17, yet permitting transverse motion to be applied through torsion, and longitudinal motion by tension and compression of link 28.

Figure 5:
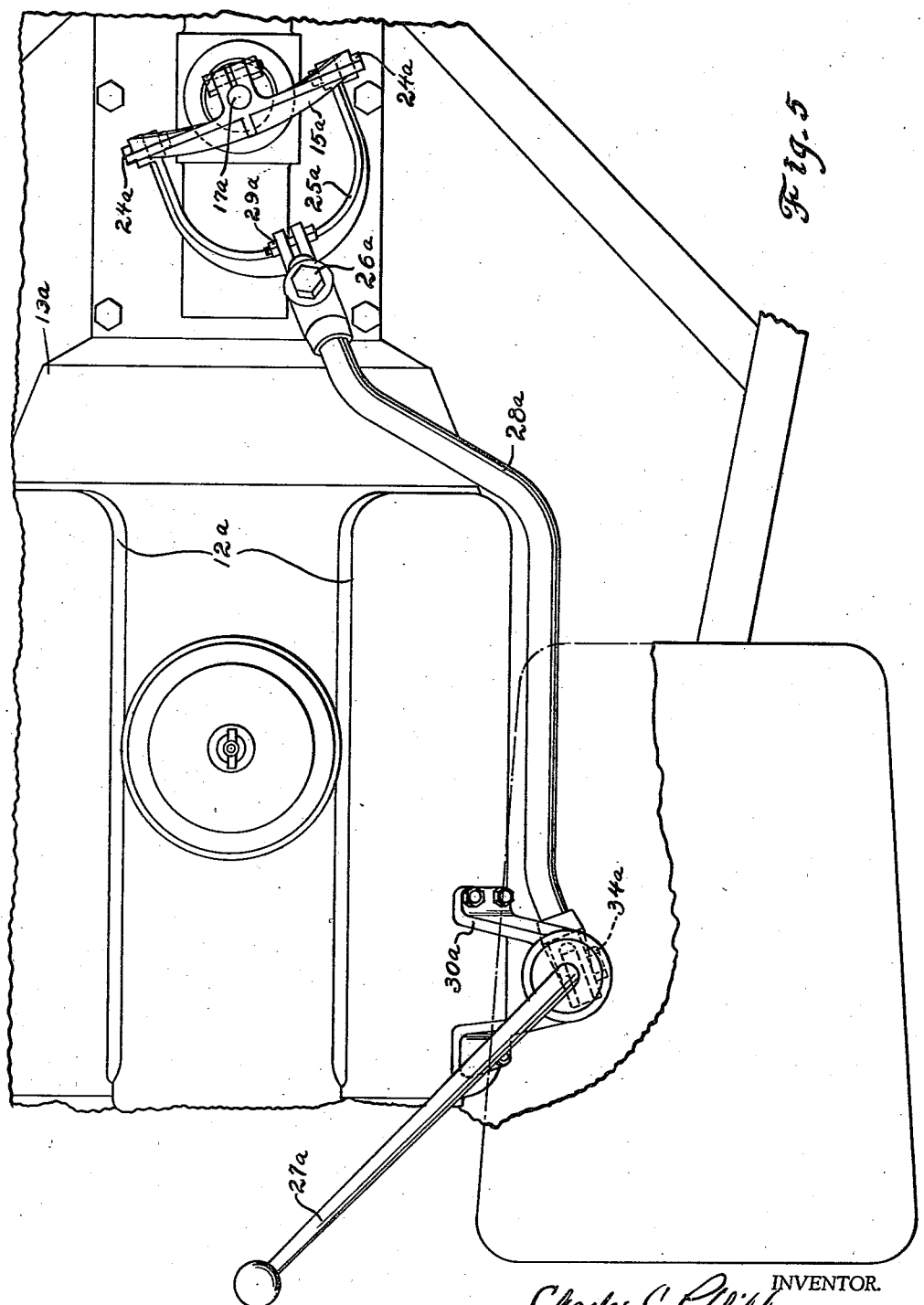
Figure 5 is a plan view of such modified construction.

In the modified construction shown in Figures 4 and 5 the link 28a is arranged in a depressed position which enables locating it beneath the floor boards of most vehicles—dependent of course upon the body construction. The hand lever 27a is articulated to the link by a transverse pivot pin 34a located below centre 32a and carried by a downward continuation of the lever. The support 30a is of open construction to allow connection of the link to such extension. The transmission end of the link is connected to main lever 17a by a pair of articulated yokes 15a—25a. The former yoke 15a extends downwardly from the lever, to which it is rigidly fastened upon either side of the support 20a, and is articulated to yoke 25a at its lower extremities by pivot bolts 24a, the arrangement of whose axes is similar to that of the axis of pivot bolt 24 in the embodiment first described. At its other end the yoke 25a carries a lug portion 23a articulated as by pivot bolt 26a to the link 28a. In the shown construction the lug portion 23a is rotatable for adjustment about a longitudinal axis but normally rigidly held against turning by means of a clamp portion carried by yoke 25a and operable by the clamping bolt 29a.

The operation of this embodiment will be seen to be similar to the embodiment first described. It will be understood that so long as the axes of the pivoted portions are properly arranged, substantially in the manner disclosed, the yokes or other articulating means, and the link itself, may be bent to provide clearance for and transmission of the motion around any desired intervening objects, and the movement may be transmitted in any desired direction.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In combination with driving and driven levers spaced from each other and limitedly movable through a plurality of planes, connecting means for driving the latter from the former comprising a pair of links articulated to each other upon a transverse axis, and pivot means connecting the free end of each link to one of said levers, said pivot means being parallel to each other in at least one position through which said levers are movable but at right angles both to said first mentioned axis of articulation of the links and to at least one of said links.

2. Means for transmitting corresponding motion from one to another of a pair of levers spaced from each other and each rockable in two transverse planes, where the planes of movement of the two levers are substantially parallel, comprising a link, pivot means connecting said link at its one end to one of said levers, at a point spaced from the fulcrum of the lever, the axis of said pivot means being transverse to one of the planes of movement of the lever, and transverse to the link, said pivot means also being substantially parallel to the other of said planes of movement, and means including two pivot portions at right angles to each other connecting the other end of said link to the other lever at a point spaced from the center of movement of the lever, whereby the link is capable of bodily pivotal movement with relation to said second lever about a pair of axes perpendicular to each other and to the link, one of said last mentioned axes being substantially parallel to the axis of said first mentioned pivot means, which said parts are in at least one position whereby rocking movement of one lever through one of said planes may be transmitted to the other lever through the link in torsion, and rocking movement of the lever through the other plane may be transmitted through the link in tension or compression.

3. In combination with a pair of levers limitedly universally movable about spaced axes, and means for transmitting corresponding motion from one lever to the other comprising a link assembly extending therebetween and formed in a plurality of sections, pivot means connecting the link assembly to one lever upon an axis spaced from the fulcrum of the lever and substantially at right angles to both the link assembly and the lever, additional pivot means incorporated in said link assembly including a pair of pivots having axes substantially at right angles to the link assembly and to each other, one of said pivots uniting sections of the link assembly and another connecting the link assembly to the other lever at a point spaced from the fulcrum of said other lever.

4. Apparatus of the character described including a pair of levers fulcrumed upon spaced axes and each movable in a plurality of substantially parallel planes, one of said levers having a handle arm extending upon one side of the fulcrum and an operatng arm extending upon the opposite side of the fulcrum, and the other lever having an arm extending accessibly from only one side of its fulcrum and substantially parallel to the operating arm of the first, means connecting said levers for transmitting corresponding movement from one to the other comprising a link pivoted to said operating arm upon a pivot axis transverse to the link, an extension rigidly secured to the accessible arm of the other lever and projecting in the opposite direction beyond its fulcrum, and a plurality of pivot means one pivotally connecting the other end of the link to said extension, said pivot means being at right angles to each other and to the axis of the link, at least one thereof being axially substantially parallel to the first mentioned pivot axis when the parts are in at least one position.

5. Means as set forth in claim 3 in which said levers project in the same general direction from their centers of movement, the part of one lever so projecting having an operating portion, and the part of the other lever so projecting constituting a driven portion, an arm rigidly connected to each of said levers and extending upon the opposite side of the center of movement of each lever, said link assembly being connected at its ends to said arms.

6. Means as set forth in claim 3 in which said levers project in the same general direction from their centers of movement, one of said levers comprising a driving lever and the other a driven lever, and in which the driven lever extends accessibly only upon such side of its center of movement, an arm secured to said driven lever and projecting outwardly therefrom and backward in a direction opposite to that in which said lever so projects, said link element being secured to such arm upon the opposite side of the center of movement of said driven lever.

CHARLES C. GLIDDEN.